(12) United States Patent
Chowdhury

(10) Patent No.: US 11,030,243 B2
(45) Date of Patent: Jun. 8, 2021

(54) STRUCTURE BASED STORAGE, QUERY, UPDATE AND TRANSFER OF TREE-BASED DOCUMENTS

(75) Inventor: Sandeep Chowdhury, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 13/407,061

(22) Filed: Feb. 28, 2012

(65) Prior Publication Data

US 2012/0158790 A1 Jun. 21, 2012

Related U.S. Application Data

(63) Continuation of application No. 11/944,713, filed on Nov. 26, 2007, now Pat. No. 8,176,084.

(51) Int. Cl.
*G06F 16/83* (2019.01)

(52) U.S. Cl.
CPC .................................. *G06F 16/83* (2019.01)

(58) Field of Classification Search
CPC ......... G06F 17/30917; G06F 17/30961; G06F 17/30327; G06F 17/30905; G06F 16/83
See application file for complete search history.

(56) References Cited

U.S. PATENT DOCUMENTS

| 5,758,152 | A | 5/1998 | LeTourneau |
| 5,778,384 | A | 7/1998 | Provino et al. |
| 6,215,563 | B1 | 4/2001 | Onishi et al. |
| 6,535,875 | B2 * | 3/2003 | Takahashi ............... G06F 16/30 |
| 6,741,999 | B2 * | 5/2004 | Wagner |
| 7,003,675 | B2 | 2/2006 | Benaloh |
| 7,124,147 | B2 * | 10/2006 | Perry ............................ 707/741 |
| 7,143,110 | B2 | 11/2006 | Tomari et al. |
| 7,228,296 | B2 | 6/2007 | Matsuda |
| 7,421,445 | B2 * | 9/2008 | O'Neil et al. |
| 7,523,103 | B2 | 4/2009 | Goel et al. |
| 7,711,726 | B2 | 5/2010 | Iijima et al. |
| 7,822,788 | B2 * | 10/2010 | Kanawa ....................... 707/811 |
| 7,827,219 | B2 | 11/2010 | Chowdhury |
| 8,145,674 | B2 | 3/2012 | Chowdhury |
| 8,176,084 | B2 | 5/2012 | Chowdhury |
| 8,180,802 | B2 * | 5/2012 | Beyer et al. .................. 707/797 |
| 8,352,502 | B2 | 1/2013 | Chowdhury |
| 8,572,127 | B2 | 10/2013 | Chowdhury |
| 2002/0143521 | A1 * | 10/2002 | Call ................................. 704/1 |

(Continued)

FOREIGN PATENT DOCUMENTS

WO 01/13571 A1 2/2001

OTHER PUBLICATIONS

United States Patent and Trademark Office, Notice of Allowance for U.S. Appl. No. 12/879,876, dated Jun. 7, 2012, pp. 1-15, Alexandria, VA, USA.

(Continued)

*Primary Examiner* — Boris Gorney
*Assistant Examiner* — Christy Y Kim
(74) *Attorney, Agent, or Firm* — Christopher M. Pignato

(57) ABSTRACT

Data is represented as a tree structure. A structure identifier (ID) that mathematically defines a structure of the tree structure is calculated. The structure ID is a representation of the structure of the tree structure and is independent of node names and node values of the tree structure. A mapping of the structure ID to the tree structure is stored.

15 Claims, 20 Drawing Sheets

Structure Id = 14144 student XML
```
<student id="S001" name="Sumit" age="15" addressId="A001">
  <subject>History</subject>
  <marks>75</marks>
</student>
```

(56) References Cited

U.S. PATENT DOCUMENTS

| | | | |
|---|---|---|---|
| 2005/0027743 | A1* | 2/2005 | O'Neil et al. ............. 707/104.1 |
| 2006/0004791 | A1* | 1/2006 | Kleewein et al. ............ 707/100 |
| 2006/0173927 | A1* | 8/2006 | Beyer et al. ................. 707/201 |
| 2007/0156842 | A1* | 7/2007 | Vermeulen ........ G06F 17/30212 709/217 |
| 2007/0185845 | A1* | 8/2007 | Nonomura ....................... 707/3 |
| 2008/0033987 | A1* | 2/2008 | Carter ....................... 707/103 R |
| 2009/0106298 | A1* | 4/2009 | Furusho ........................ 707/102 |
| 2009/0254571 | A1* | 10/2009 | Cassel ................... G06Q 10/10 |
| 2009/0254572 | A1* | 10/2009 | Redlich ................ G06Q 10/06 |

OTHER PUBLICATIONS

United States Patent and Trademark Office, Office Action for U.S. Appl. No. 11/944,713, dated Oct. 29, 2010, pp. 1-9, Alexandria, VA, USA.

United States Patent and Trademark Office, Office Action for U.S. Appl. No. 11/944,713, dated Mar. 3, 2011, pp. 1-12, Alexandria, VA, USA.

United States Patent and Trademark Office, Office Action for U.S. Appl. No. 11/944,713, dated Sep. 1, 2011, pp. 1-17, Alexandria, VA, USA.

United States Patent and Trademark Office, Notice of Allowance for U.S. Appl. No. 11/944,713, dated Jan. 5, 2012, pp. 1-15, Alexandria, VA, USA.

United States Patent and Trademark Office, Office Action for U.S. Appl. No. 11/944,726, dated Aug. 18, 2010, pp. 1-12, Alexandria, VA, USA.

United States Patent and Trademark Office, Office Action for U.S. Appl. No. 11/944,726, dated Nov. 26, 2010, pp. 1-12, Alexandria, VA, USA.

United States Patent and Trademark Office, Office Action for U.S. Appl. No. 11/944,726, dated Apr. 4, 2011, pp. 1-32, Alexandria, VA, USA.

United States Patent and Trademark Office, Notice of Allowance for U.S. Appl. No. 11/944,726, dated Nov. 18, 2011, pp. 1-19, Alexandria, VA, USA.

United States Patent and Trademark Office, Office Action for U.S. Appl. No. 12/879,876, dated Dec. 22, 2010, pp. 1-20, Alexandria, VA, USA.

United States Patent and Trademark Office, Office Action for U.S. Appl. No. 12/879,876, dated Mar. 1, 2011, pp. 1-15, Alexandria, VA, USA.

United States Patent and Trademark Office, Office Action for U.S. Appl. No. 12/879,876, dated Jan. 5, 2012, pp. 1-19, Alexandria, VA, USA.

Temple, The Complete Idiot's Guide to Microsoft Outlook 2000, May 1999, pp. 47, 71, 119, 124-126, 151, 156, 163, 165, 167, and 241, Macmillan Computer Publishing, USA.

Extensible Markup Language (XML) 1.0 (Fourth Edition) W3C Recommendation, Aug. 16, 2006, edited in place Sep. 29, 2006 (http://www.w3.org/TR/2006/REC-xml-20060816) (As cited within Office Action for U.S. Appl. No. 11/944,713).

XML 1.0 Fourth Edition Specification Errata, all entries to Aug. 15, 2008, pp. 1-11, W3C, http://www.w3.org/XML/xml-V10-4e-errata.

Kevin Kelleher, Digest Man Pages, Webpage/site: greatcircle.com, Aug. 30, 1996, pp. 1-4, Published on the World Wide Web at: http://www.greatcircle.com/lists/majordomo-docs/mhonarc/majordomo-docs.199608/msg00002.html.

Eric Weisstein, Subset/Subtree, Webpage/site: Wolfram Mathworld, Oct. 16, 2004 (publication date verified by USPTO as cited within Office Action dated Mar. 1, 2011, for U.S. Appl. No. 12/879,876), pp. 1-2, Published on the World Wide Web at: http://mathworld.wolfram.com/Subtree.html & http://mathworld.wolfram.com/Subset.html.

Chapman, et al., Majordomo FAQ, Webpage/site: greatcircle.com, Jan. 18, 2000 (publication date verified by USPTO as cited within Office Action dated Mar. 1, 2011, for U.S. Appl. No. 12/879,876), pp. 1-14, Published on the World Wide Web at: http://www.greatcircle.com/majordomo/majordomo-faq.html.

Chapman, et al., Majordomo Source Code (PERL), Jan. 18, 2000 (as cited within Office Action dated Mar. 1, 2011, for U.S. Appl. No. 12/879,876, publication date verified by USPTO), NPL document file was not provided to Applicant within the Office Action (please see p. 32); please refer to USPTO database for file or URL provided in form 892: http://www.greatcircle.com/majordomo/1.94.5/majordomo-1.94.5.tar.gz - source code.

Zuo-Peng Liang, et al., Clustering XML Documents Based on a Structural Summary Tree, Journal of Applied Sciences, vol. 23, No. 1, Jan. 2005, pp. 71-74, Tsinghua Tongfang Knowledge Network Technology Co., Ltd. Beijing, P.R.C.

Jose Torres-Jimenez, et al., Linear Algorithms for Encoding/Decoding Directed Labelled Trees Suitable for a Genetic Algorithm, WSEAS Transactions of Systems, vol. 2, No. 4, Oct. 2003, pp. 1079-1081, Published on the World Wide Web at: http://www.tamps.cinvestav.mx/~jtj/conferences/2003/Linear%20algorithms%20for%20encoding_decoding%20directed%20labelled%20trees%20suitable%20for%20a%20Genetic%20Algorithm.pdf.

Yi Chen, et al., L-Tree: a Dynamic Labeling Structure for Ordered XML Data, Book Chapter: LNCS 3268—Current Trends in Database Technology, pp. 1-10, 2004, Springer-Verlag Berlin Heidelberg, Germany.

Xiaodong Wu, et al., A Prime Number Labeling Scheme for Dynamic Ordered XML Trees, Article: Proceedings of the 20th International Conference on Data Engineering, pp. 1-13, 2004, IEEE Computer Society, Published on the World Wide Web.

Gongzhu Hu, et al., Indexing XML Data for Path Expression Queries, Book Chapter: LNCS 3026—Software Engineering Research and Applications, pp. 332-348, 2004, Springer-Verlag Berlin Heidelberg, Germany.

Gap-Joo Na, et al., A Relational Nested Interval Encoding Scheme for XML Storage and Retrieval, Book Chapter: LNCS 3689—Information Retrieval Technology, pp. 715-720, 2005, Springer-Verlag Berlin Heidelberg, Germany.

Haixun Wang, et al., ViST: A Dynamic Index Method for Querying XML Data by Tree Structures, Article: Proceedings of the 2003 ACM SIGMOD International Conference on Management of Data, pp. 1-12, Jun. 2003, Association for Computing Machinery (ACM), San Diego, CA.

United States Patent and Trademark Office, Office Action for U.S. Appl. No. 13/566,771, dated Sep. 17, 2012, pp. 1-17, Alexandria, VA, USA.

United States Patent and Trademark Office, Office Action for U.S. Appl. No. 13/566,771, dated Feb. 25, 2013, pp. 1-10, Alexandria, VA, USA.

United States Patent and Trademark Office, Notice of Allowance for U.S. Appl. No. 13/566,771, dated May 17, 2013, pp. 1-13, Alexandria, VA, USA.

[MS-PST]: Outlook Personal Folders (.pst) File Format, released Mar. 15, 2011, Microsoft, 1-199. As cited within Office Action for U.S. Appl. No. 11/944,726 dated Apr. 4, 2011.

* cited by examiner

```
<students>
  <student name="Sumit" age="15">
    <subject>History</subject>
    <marks>75</marks>
  </student>
  <student name="Reva" age="16">
    <subject>Geography</subject>
    <marks>68</marks>
  </student>
</students>
```

Fig. 1A

```
<Library>
  <Book id="B001">
    <Title>Numerical Analysis</Title>
    <Author>Fred Jones</Author>
  </Book>
  <Journal id="J001">
    <Title>Journal of Mathematics</Title>
    <Year>2006</Year>
    <Volume>12</Volume>
  </Journal>
</Library>
```

Book template
<Book id="*">
 <Title>*</Title>
 <Author>*</Author>
</Book>

Journal template
<Journal id="*">
    <Title>*</Title>
    <Year>*</Year>
    <Volume>*</Volume>
</Journal>

Structure Id = 14144 student XML
<student id="S001" name="Sumit" age="15" addressId="A001">
  <subject>History</subject>
  <marks>75</marks>
</student>

Structure Id = 5445440 address XML
<address id="A001">
   <houseNumber>10</houseNumber>
   <street>Green Avenue</street>
   <city>Bangalore</city>
   <country>India</country>
   <PIN>560012</PIN>
</address>

```
<Parent attr1="A1" attr2="A2">
    <Child>hello</Child>
</Parent>
```

XML Structure Code: 56

```
<Parent attr1="A1">
    Text1
    <Child>hello</Child>
</Parent>
```

```
<Parent>
    <Child attr1="A1">hello</Child>
</Parent>
```

```
<Parent>
    Text1
</Parent>
```

Empty tags
<Tag/>

STRUCTURE BASED STORAGE, QUERY, UPDATE AND TRANSFER OF TREE-BASED DOCUMENTS

RELATED APPLICATIONS

This application is a continuation of and claims priority to and claims the benefit of U.S. patent application Ser. No. 11/944,713 titled "STRUCTURE BASED STORAGE, QUERY, UPDATE AND TRANSFER OF TREE-BASED DOCUMENTS," which was filed in the United States Patent and Trademark Office on Nov. 26, 2007, which has a current status of "Allowed," and which is incorporated herein by reference in its entirety. This application is also related to U.S. patent application Ser. No. 11/944,726 titled "STRUCTURE BASED STORAGE, QUERY, UPDATE AND TRANSFER OF TREE-BASED DOCUMENTS," which was filed in the United States Patent and Trademark Office on Nov. 26, 2007, and which has a current status of "Allowed," and is related to U.S. patent application Ser. No. 12/879,876 titled "STRUCTURE BASED STORAGE, QUERY, UPDATE AND TRANSFER OF TREE-BASED DOCUMENTS," which was filed in the United States Patent and Trademark Office on Sep. 10, 2010, both of which are incorporated herein by reference in their entirety.

BACKGROUND

This invention relates to a method for storing, querying, updating, and transferring documents, and in particular to the storing, querying, updating, and transferring of tree-based documents based on tree structure.

XML is used in a wide variety of applications as a format for storing and transferring data. However, the current techniques of storing and transferring XML data experience a number of disadvantages, some of which are listed below:

1. Significant Transfer of Redundant Data Involved
   It is generally the case that together with the actual data values which are transferred, XML element and attribute names are also transferred, or an entire XML document is transferred even though only a portion of the document has in fact changed. When data is passed across the network, data redundancy causes unnecessary usage of network bandwidth. Further, significant parsing may be involved on the receiver's end to extract the actual data content.
2. Context of Transferred Data Revealed
   If XML data is transferred unencrypted, the element and attribute names and values can reveal the context of the data. For example, tags such as:
   <CreditCardNumber>12345 . . . </CreditCardNumber>
   reveal sensitive information.
   Even if label-path based expressions such as XPath are used to identify information in an XML document, such expressions contain the attribute and element names of the document. An unencrypted expression such as Account/CreditCardNumber used in querying the document still reveals the context of the information queried.
   Conversely, if the XML data is encrypted to hide the context of the information being transferred, additional overhead for encryption is incurred, which contributes to the complexity and slowing-down of the data transfer operation.
3. Necessary for Both Sender and Receiver to Refer to Identical Metadata Values
   This drawback is illustrated with reference to the following XML code:

```
<student id = "S001">
    <subject Id>SBJ001</subject Id>
    <marks>75</marks>
</student>
```

In this example, it is assumed that the value of marks is to be communicated by the sender to the receiver. Using conventional methods, this is achieved by referring to the element name "marks." If, however, the metadata referring to the data value are in different languages on the sender's side and receiver's side, for example if the metadata is in Japanese on the sender side and in English on the receiver side, the communication fails if the path expression uses a label-based syntax such as XPath.

4. Data Cannot be Filtered by Processing a Concise Representation of XML
   Conventional techniques require the XML document to be parsed when data needs to be extracted from the document. This is computationally intensive and time consuming.
5. Context of Stored Data Revealed
   Databases which store XML data, store the data along with the element and attribute names. Hence if the element and attribute names are unencrypted, the context of the information will be revealed to anyone having sufficient privilege to access the database, for example an administrator. If XML data is to be stored in a site hosted by a third-party vendor without revealing the context of the data, there is at present no alternative way to achieve this with present techniques, other than by encryption.

There are at present no known methods which address all the above disadvantages together.

The first disadvantage is only partially addressed with the conventional methods of passing label path-based expressions to identify the required data value without transferring the entire document.

For example, for the following XML data:

```
                            Library.xml
<Library>
    <Book id="B001">
        <Title>Numerical Analysis</Title>
        <Author>Fred Jones</Author>
    </Book>
    <Journal id="J001">
        <Title>Journal of Mathematics</Title>
        <Year>2006</Year>
        <Volume>12</Volume>
    </Journal>
</Library>
``` the Title of the Journal is referred by the expression Library/Journal/Title or //Journal/Title. However this expression still reveals the context of the data. Further, such expressions can by themselves lead to appreciable data redundancy especially when the attribute and element names, and the levels of nesting of the document are large.

The transfer of redundant data may be ameliorated by stripping the metadata (such as XML tags, attributes, etc.)

from the data content. However, a problem then arises identifying data sent without meta-data by a receiver. The following example of a receiver receiving XML data to update an object database, illustrates this problem:

The XML data stored in the database is:

```
<student id="S001" name="Sumit" age="15" addressId="A001">
    <subject>History</subject>
    <marks>75</marks>
</student>
<address id="A001">
    <houseNumber>10</houseNumber>
    <street>Green Avenue</street>
    <city>Bangalore</city>
    <country>India</country>
    <PIN>560012</PIN>
</address>
```

It is assumed that the student's mark is to be changed from 75 to 78. Sending this data (i.e., the new mark '78') without meta-data such as XML tags raises the problem of how the receiver is to identify, firstly, which record the data belongs to (student or address), and secondly, which field the data belong to.

Wang et al., "*ViST: A Dynamic Index Method for Querying XML Data by Tree Structures*," Proceedings of the ACM SIGMoD International Conference on Management of Data, 2003, p 110-121, describe an index structure for searching XML documents. By representing both XML documents and XML queries in structure-encoded sequences, it is shown that querying of XML data is equivalent to finding subsequence matches. Unlike index methods that disassemble a query into multiple sub-queries, and then join the results of these sub-queries to provide the final answers, ViST uses tree structures as the basic unit of a query to avoid expensive join operations. ViST further provides a unified index on both content and structure of the XML documents, hence it has a performance advantage over the methods indexing either just content or structure. ViST supports dynamic index update, and it relies solely on B+Trees without using any specialized data structures that are not well supported by DBMSs. Structure-encoded sequences as described in ViST however includes the element and attribute names and values as part of the structure-encoded sequences, which reveal the context of the data.

However, there is still a need for a method of handling XML data (and other tree-based documents) using a structure-based processing technique that addresses and ameliorates one or all of the above described disadvantages.

BRIEF SUMMARY

According to an aspect of the invention, a method for storing data comprises representing the data as a tree structure, calculating a structure ID for the tree structure, the structure ID being a representation of the tree structure and independent of node names and node values of the tree structure, and storing a mapping of the structure ID to the tree structure.

According to a further aspect of the invention, a method for processing data stored as a tree structure identifiable by a structure ID comprises receiving a structure ID, receiving a first node ID, identifying a tree structure corresponding to the structure ID, and identifying a node within the tree structure corresponding to the first node ID. The identified node is then subject to further processing.

According to a further aspect of the invention, a data transfer method comprises receiving a structure ID identifying a tree structure, receiving a node ID identifying a node within the tree structure, constructing transfer data according to a predetermined format, the predetermined format including at least the structure ID and the node ID, and transferring the constructed transfer data to a receiver.

According to a further aspect of the invention, a data receiving method for receiving transfer data containing therein a structure ID and a node ID comprises extracting the structure ID and the node ID from the transfer data, identifying a tree structure represented by the structure ID, identifying a node within the tree structure represented by the node ID, and operating on the identified node.

According to a further aspect of the invention, a method for routing data to a subscriber, comprises receiving a document name identifying a document storing the subscribed data, receiving a fragment ID identifying a tree fragment in which subscribed data is stored, identifying a tree having a structure ID mapping to the received document name, identifying a fragment in the tree having a fragment ID matching the received fragment ID, retrieving node values of the fragment from the tree, and routing the node values to the subscriber.

According to a further aspect of the invention, a method for filtering data comprises receiving a structure ID, determining if a structure having a predetermined fragment ID is present in a tree represented by the received structure ID, determining node IDs of the nodes of the structure, retrieving from a data store node values corresponding to the node IDs.

BRIEF DESCRIPTION OF THE SEVERAL VIEWS OF THE DRAWINGS

Aspects of and one or more embodiments of the present invention will now be described with reference to the drawings, in which:

FIG. 1A shows an exemplary XML document.

DETAILED DESCRIPTION

Overview

Described is a technique to uniquely represent the structure of XML documents and fragments of such documents by a numerical value referred to as a structure ID. The structure ID may be utilised by routers to route XML documents.

Transferring of data is achieved without passing metadata that may reveal the context of the information being transferred. This is realized by using metadata such as node IDs, rather than node names/labels such as XML tags. In this manner the overheads associated with encrypting data are avoided. Further, metadata names referring to data values in a document may be different on the sender's and receiver's side. Globalization issues, such as where names referring to identical data values are stored in different languages across the clients and servers, are also resolved.

Data is represented in a concise form that can be manipulated to extract metadata about the required information. The actual information can be queried from a data store using metadata obtained during a filtering process. A concise representation of the document can hence be transferred, instead of the much larger actual document. Data values are stored without context revealing metadata. In this manner, the context of the information is not revealed.

Figure 12:
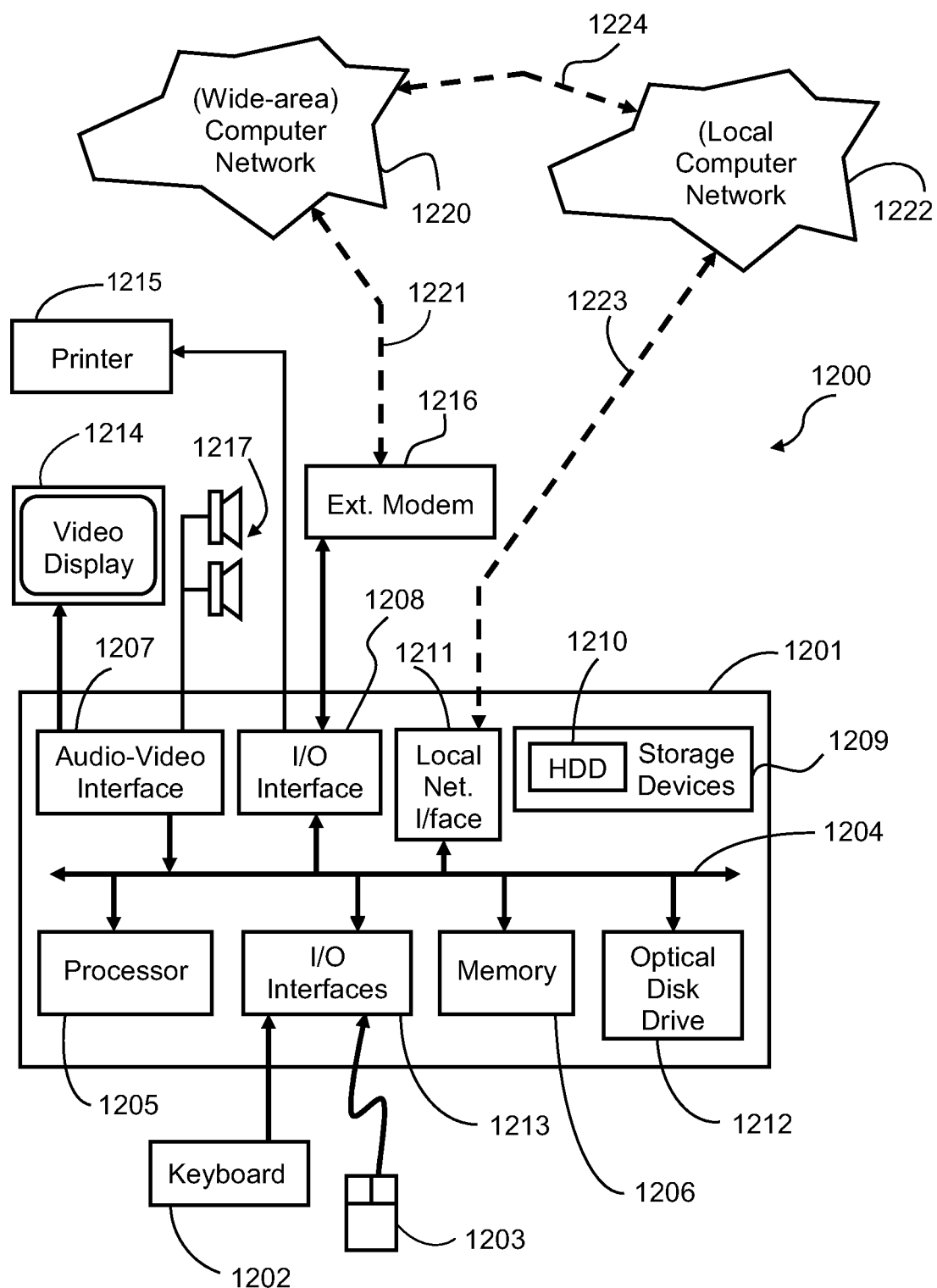
FIG. 12 shows a schematic block diagram representation of a general purpose computer system embodying the described invention.

The disclosed invention may be implemented using a computer system 1200, such as that shown in FIG. 12 wherein the processes described may be implemented by software, such as one or more application programs executable within the computer system 1200. In particular, the steps of the process are affected by instructions in the software that are carried out within the computer system 1200. The instructions may be formed as one or more code modules, each for performing one or more particular tasks. The software may be stored on a computer readable medium, including the storage devices described below, for example. The software is loaded into the computer system 1200 from the computer readable medium, and then executed by the computer system 1200. A computer readable medium having such software or computer program recorded on it is a computer program product. The use of the computer program product in the computer system 1200 preferably affects an advantageous apparatus for transferring, storing, and otherwise manipulating tree-based data, such as XML data.

As seen in FIG. 12, the computer system 1200 is formed by a computer module 1201, input devices such as a keyboard 1202 and a mouse pointer device 1203, and output devices including a printer 1215, a display device 1214 and loudspeakers 1217. An external Modulator-Demodulator (Modem) transceiver device 1216 may be used by the computer module 1201 for communicating to and from a communications network 1220 via a connection 1221. The network 1220 may be a wide-area network (WAN), such as the Internet or a private WAN. Where the connection 1221 is a telephone line, the modem 1216 may be a traditional "dial-up" modem. Alternatively, where the connection 1221 is a high capacity (e.g., cable) connection, the modem 1216 may be a broadband modem. A wireless modem may also be used for wireless connection to the network 1220.

The computer module 1201 typically includes at least one processor unit 1205, and a memory unit 1206 for example formed from semiconductor random access memory (RAM) and read only memory (ROM). The module 1201 also includes a number of input/output (I/O) interfaces including an audio-video interface 1207 that couples to the video display 1214 and loudspeakers 1217, an I/O interface 1213 for the keyboard 1202 and mouse 1203 and optionally a joystick (not illustrated), and an interface 1208 for the external modem 1216 and printer 1215. In some implementations, the modem 1216 may be incorporated within the computer module 1201, for example within the interface 1208. The computer module 1201 also has a local network interface 1211 which, via a connection 1223, permits coupling of the computer system 1200 to a local computer network 1222, known as a Local Area Network (LAN). As also illustrated, the local network 1222 may also couple to the wIDe network 1220 via a connection 1224, which would typically include a so-called "firewall" device or similar functionality. The interface 1211 may be formed by an Ethernet circuit card, a wireless Bluetooth™ or an IEEE 802.11 wireless arrangement.

The interfaces 1208 and 1213 may afford both serial and parallel connectivity, the former typically being implemented according to the Universal Serial Bus (USB) standards and having corresponding USB connectors (not illustrated). Storage devices 1209 are provided and typically include a hard disk drive (HDD) 1210. Other devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD), USB-RAM, and floppy disks for example may then be used as appropriate sources of data to the system 1200.

The components 1205 to 1213 of the computer module 1201 typically communicate via an interconnected bus 1204 and in a manner which results in a conventional mode of operation of the computer system 1200 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 1210 and read and controlled in execution by the processor 1205. Intermediate storage of such programs and any data fetched from the networks 1220 and 1222 may be accomplished using the semiconductor memory 1206, possibly in concert with the hard disk drive 1210. In some instances, the application programs may be supplied to the user encoded on one or more CD-ROM and read via the corresponding drive 1212, or alternatively may be read by the user from the networks 1220 or 1222. Still further, the software can also be loaded into the computer system 1200 from other computer readable media. Computer readable media refers to any storage medium that participates in providing instructions and/or data to the computer system 1200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module

1201. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The methods of the following embodiments may alternatively be implemented in dedicated hardware such as one or more integrated circuits performing the functions or sub functions of the described processes. Such dedicated hardware may include graphic processors, digital signal processors, or one or more microprocessors and associated memories.

XML Document Structure

Figure 1B:
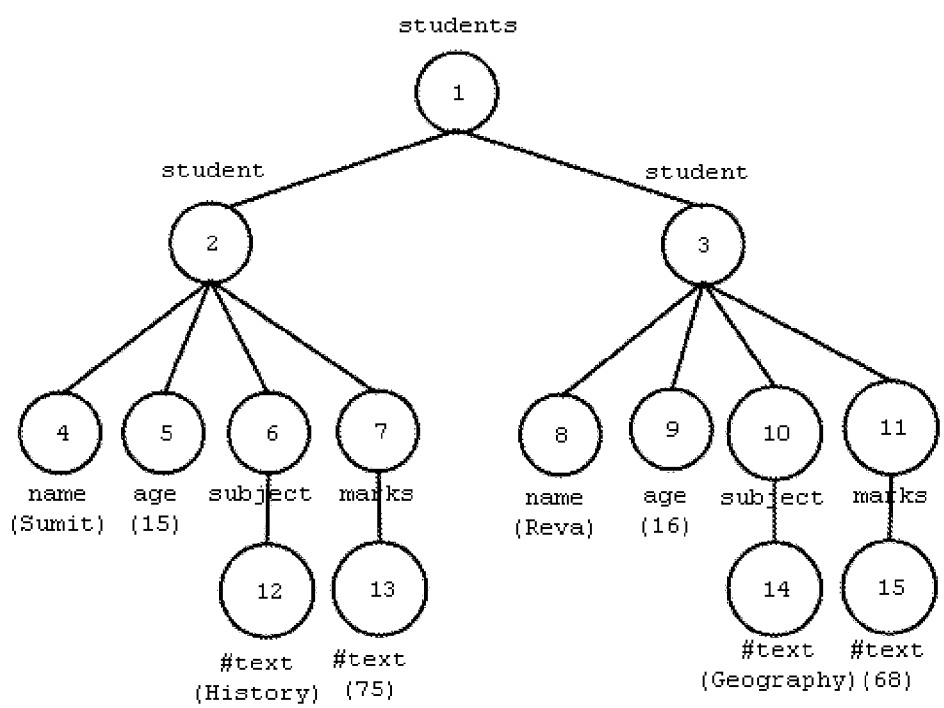
FIG. 1B shows a corresponding tree structure of the XML document of FIG. 1A.

The structure of an XML document is defined as a mathematical tree. An exemplary XML document is shown in FIG. 1A, and a corresponding tree structure of the XML document is shown in FIG. 1B.

Three type of nodes are present in the XML document: element nodes (shown in bold in FIG. 1A), attribute nodes (shown underlined), and text nodes which are the data values of the element nodes (shown in italics).

An XML tree is typically constructed from an XML document according to the following rules:

The root node of the XML document is the root node of the XML tree.

The parent-child relationship of the element nodes in the XML tree correspond to the parent-child relationship of the elements in the XML document.

Attributes of the elements in the XML document are represented as child nodes of the XML tree. Attribute child nodes (such as "name" and "age") are placed before the element child nodes.

Attribute child nodes and element child nodes follow the same order as in the XML document.

Text nodes are represented as child nodes of their containing element nodes. Text nodes are given an arbitrary name like #text Empty elements of the form <name/> are equivalent to <name></name> and are given an empty text node as a child.

The nodes are numbered sequentially (with integer numbers) starting from 1 in the breath-first order of the tree. A number assigned to a node in this way is termed its node ID (ID is used as an abbreviation of the term "identifier").

The structure of an XML document is defined by a structure ID mathematically calculated from its corresponding tree structure constructed according to the above defined rules.

A sub-tree of an XML tree is a fragment of the XML document. The structure ID of a sub-tree is indicative of the structure of the XML fragment. The node ID of the root node of the sub-tree is the fragment ID of the fragment.

For example, the sub-tree beginning at the first student node of the tree of FIG. 1B corresponds to the XML fragment:

```
<student  name="Sumit"  age="15">
     <subject>History</subject>
     <marks>75</marks>
</student>
```

The sub-tree beginning at the subject node of the second student node corresponds to the XML fragment:

<subject>Geography</subject>

The tree structure in FIG. 1B can be generated from the XML data by parsing the data with an appropriate parser. For example, a Document Object Model (DOM) parser which creates an object tree from XML data may be used. From the parent-child relationships between the nodes within the object tree, the node IDs can be assigned to each attribute and element names and values as illustrated in FIG. 1B.

Figure 1C:
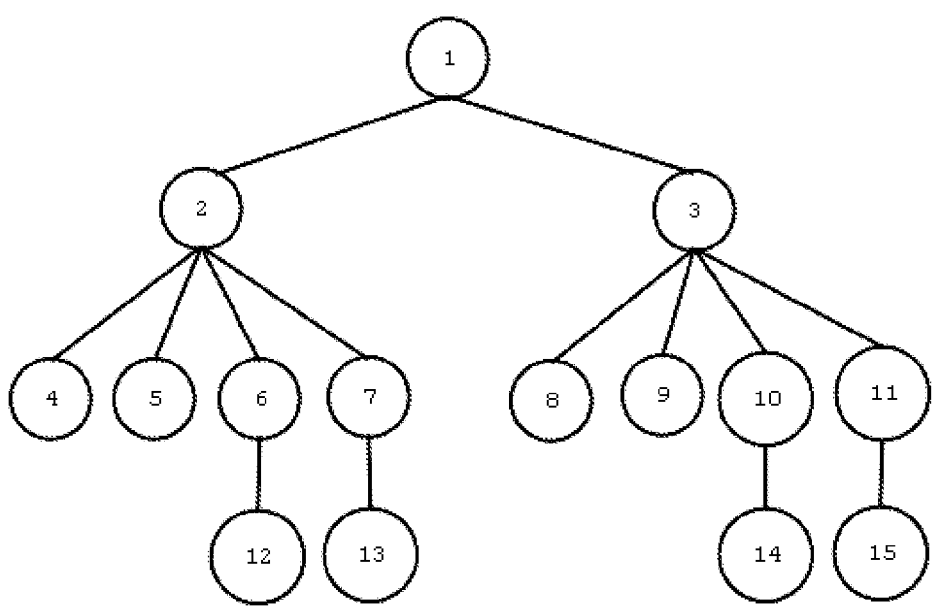
FIG. 1C shows the tree structure of FIG. 1B without node names and values.

The labelled tree structure in FIG. 1B can be represented in three parts:

1. The tree structure without names and values (as shown in FIG. 1C).
2. A mapping between the node IDs and the corresponding node names, as shown in the following table (#text nodes are not included):

| Node ID | Node Name |
|---|---|
| 1 | students |
| 2 | student |
| 3 | student |
| 4 | name |
| 5 | age |
| 6 | subject |
| 7 | marks |
| 8 | name |
| 9 | age |
| 10 | subject |
| 11 | marks |

3. A mapping between the node IDs and the corresponding node values, as shown in the following table (nodes without value are not included):

| Node ID | Node Value |
|---|---|
| 4 | Sumit |
| 5 | 15 |
| 8 | Reva |
| 9 | 16 |
| 12 | History |
| 13 | 75 |
| 14 | Geography |
| 15 | 68 |

When the labelled tree structure represents a document, the tree structure is further represented by a fourth part, being a mapping of the structure ID of the tree to the name of the document represented by the tree.

A tree structure that is part of a larger tree structure (for example, a sub-tree) may be stored separately from the main tree for the purpose of structure-base queries, and the like.

The sub-tree is treated as a separate tree having a root node ID of 0.1 The 3 parts of the sub-tree (structure ID, node ID to name mapping, node ID to value mapping) as well as an addition fragment ID of the sub-tree are stored. Referring to the Library, Book, and Journal trees of FIGS. 5A-5C, for example, Library is the main tree, whilst Book and Journal may be sub-tree which are desired to be stored separately.

Figure 5A:
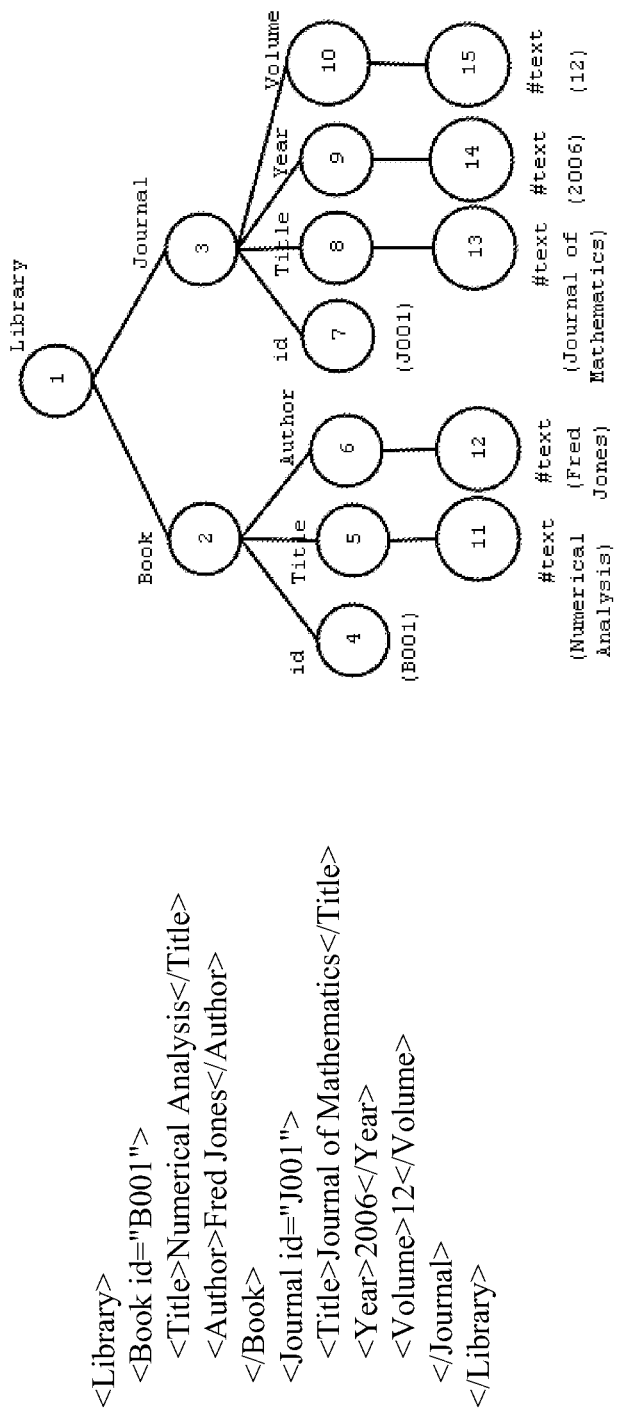
FIG. 5A shows an exemplary XML document and corresponding tree structure.
Figure 5B:
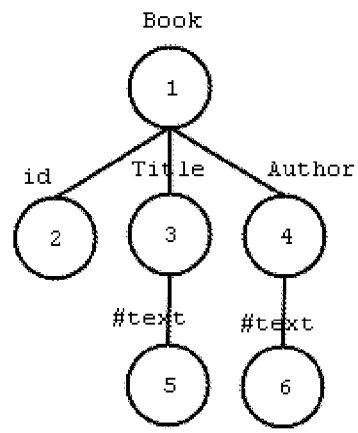
FIG. 5B shows an XML fragment of the document of FIG. 5A, and corresponding tree fragment.

In FIG. 5B, the Book structure is stored as a separate tree, including the 3 parts representing the tree as described above. Additionally, to show the connection with the main tree Library, a mapping of the fragment ID of the Book sub-tree (node 2 in the Library tree) to the Library tree is stored. This mapping can be stored as, for example, a fragment ID of Book vs. name of Library document, or fragment ID of Book vs. structure ID of Library, or a combination of the above.

Alternatively, the sub-tree is not treated as a separate tree from the main tree. Instead, the node IDs of the main tree are used to represent the node IDs of the sub-tree. Referring again to the Library, Book, and Journal example of FIGS. 5A-5C, the Book sub tree is stored with the usual 3 parts described above, but additionally, the node IDs of the Book sub-tree are made a part of the node IDs of the Library tree. Additionally, to show the connection with the main tree Library, a mapping of the fragment ID of the Book sub-tree to the Library tree is stored. This mapping may be stored in multiple ways such as a mapping of fragment ID of Book vs. name of Library document, or fragment ID of Book vs. structure ID of library, or a combination of both.

In cases where the main tree has multiple sub-trees having the same structure ID, in addition with the above-mentioned way of storing tree fragments, the index of the fragment is stored as well. For example, the index of Sumit in FIG. 1B is 1, and that of Reva is 2.

Thus, for a fragment, the tree is represented with the following parts:
  Structure ID of the fragment
  Mapping between node IDs and node names
  Mapping between the node IDs and node values
  Mapping between the main tree and sub-tree using the fragment ID of the sub-tree
  If there are multiple sub-trees with the same structure ID, associating the index of the sub-tree in the mapping described in part 4. (i.e., fragment ID[index] of sub-tree vs. document name and/or structure ID of the main tree)

The tree structure shown in FIG. 1C can be concisely represented as a structure ID. Calculation of a structure ID is described below. It should be apparent to a person skilled in the art that other similar form of mapping may be constructed and such mappings would fall within the scope of the present invention.

Calculating Structure ID

Figure 2A:
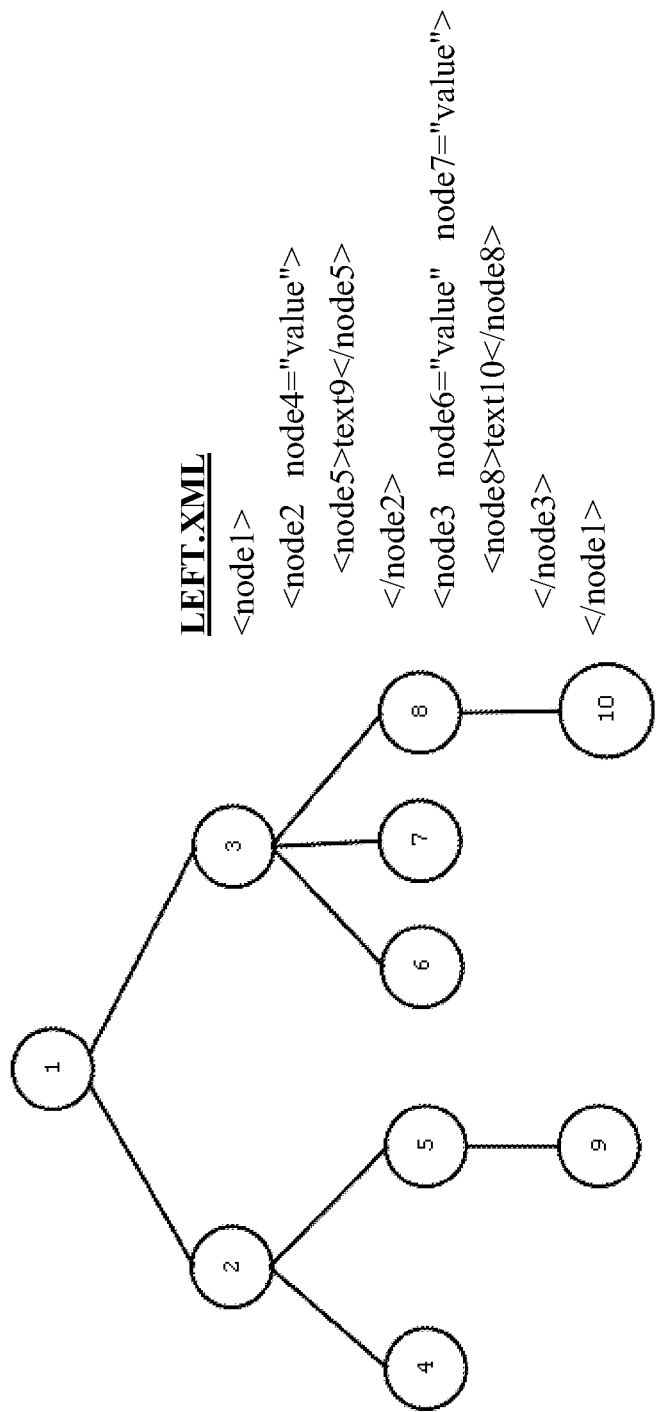
FIG. 2A illustrates an exemplary tree structure.
Figure 2B:
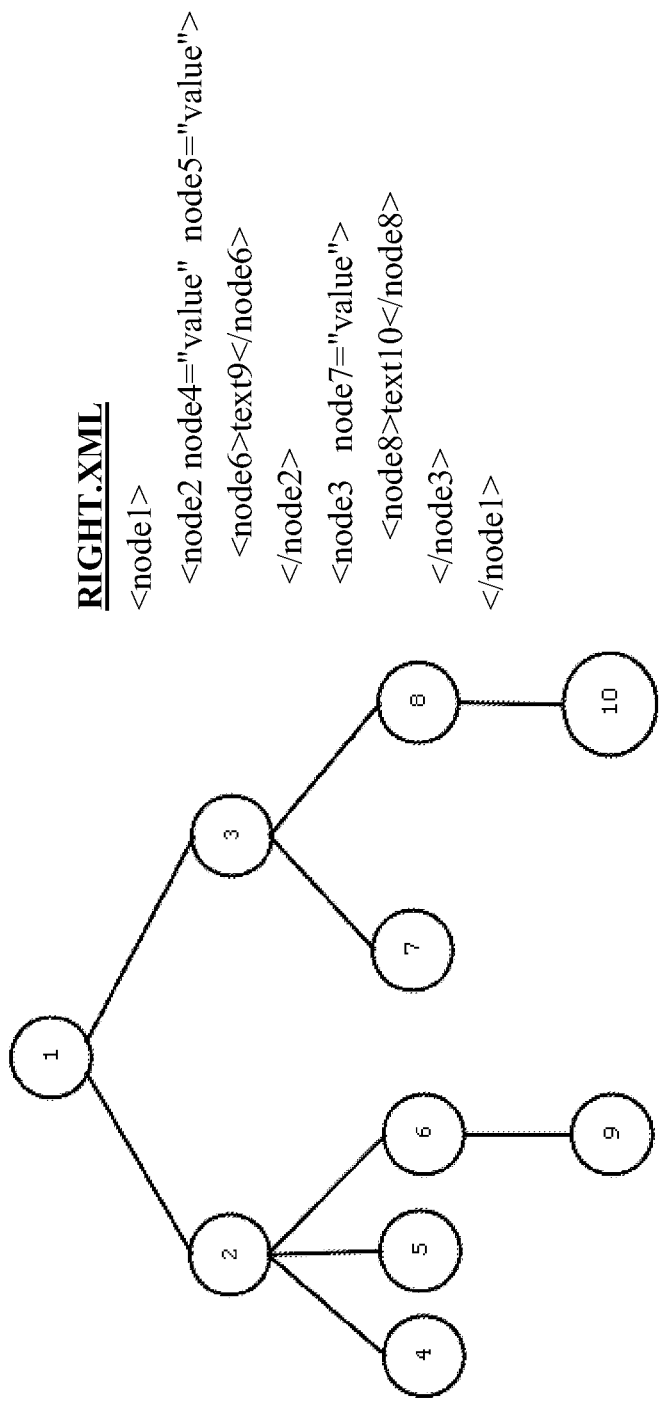
FIG. 2B illustrates an exemplary tree structure.

FIGS. 2A and 2B illustrate two tree structures. Both trees have the same number of nodes but different structures. Node IDs are first assigned to each node of a tree in the following manner:
  The root node is assigned number 1.
  As the tree is traversed from node to node, each node is assigned a number 1 greater than the previously assigned node number.
  Node ID assignment is complete when all nodes have been assigned a node ID.
  At any particular level (nodes having the same depth) of the tree, nodes are traversed from left to right sequentially
  When the last node of the level is reached the next node to traverse (if it exists) is the first node of the next level In the above manner all nodes of a tree are traversed, and node IDs are assigned to each node. Each tree node has a distinct node ID. Two trees have the same structure if the number of child nodes is the same for every node having the same node ID. This defines the condition for uniqueness of tree structures. As per this condition, the trees of FIGS. 2A and 2B have different structures since node 2 has two child nodes in the tree of FIG. 2A but 3 child nodes in the tree of FIG. 2B. The above property of a tree can be mapped to a unique natural number, hereinafter also referred to as a structure ID of a tree.

For a tree having k parent nodes assigned with node IDs $n_1, n_2, \ldots, n_k$, and where each parent node has respectively $m_1, m_2, \ldots, m_k$ child nodes, prime numbers $p_1, p_2, \ldots, p_k$ are assigned to each parent node. Prime number $p_1$ is the $n_1^{th}$ prime number in the natural set of numbers, $p_2$ is the $n_2^{th}$ prime number in the natural set of numbers, and $p_k$ is the $n_k^{th}$ prime number in the natural set of numbers. A Parent-Child table as indicated in Table 1 can be constructed as follows:

TABLE 1

| Parent Node IDs | $n_1$ | $n_2$ | — | $n_k$ |
| Number of Children | $m_1$ | $m_2$ | — | $m_k$ |
| Prime Number | $p_1$ | $p_2$ | — | $p_k$ |

The structure ID is calculated as a product of several factors of the form $p^m$, where p is a prime number corresponding to a node ID, and m is the number of children of the node:

$$\text{Structure ID} = p_1^{m1} * p_2^{m2} * \ldots * p_k^{mk} \quad (1)$$

As every natural number has unique prime factors, a structure ID is unique to a tree structure.

The Parent-Child table for the tree of FIG. 2A is illustrated in Table 2:

TABLE 2

| Parent Node IDs | 1 | 2 | 3 | 5 | 8 |
| Number of Children | 2 | 2 | 3 | 1 | 1 |
| Primes corresponding to parent node IDs | 2 | 3 | 5 | 11 | 19 |

Using the information from Table 2 in Equation (1), the structure ID is:

$$\text{Structure } ID = 2^2 * 3^2 * 5^3 * 11^1 * 19^1$$
$$= 940500$$

Similarly, the Parent-Child table for the tree of FIG. 2B is illustrated in Table 3:

TABLE 3

| Parent Node IDs | 1 | 2 | 3 | 6 | 8 |
| Number of Children | 2 | 3 | 2 | 1 | 1 |
| Primes corresponding to parent node IDs | 2 | 3 | 5 | 13 | 19 |

And using the information from Table 3 in Equation (1) the structure ID is:

$$\text{Structure } ID = 2^2 * 3^3 * 5^2 * 13^1 * 19^1$$
$$= 666900$$

The above calculation can be applied to an XML document using Document Object Model parsing (DOM parsing) to first convert the XML document to an object tree. The nodes output by DOM parsing are added to a growing list called the Main List. Creation of a Main List is described with reference to the XML document shown in FIG. 1A.

The root node of the XML document is the first element of the Main List, hence the "students" node is first added to the Main List. The first element of the Main List is given serial number "1." The contents of the Main List at this point are:

| Main List | |
|---|---|
| 1. | students node. |

The attributes and child elements are next determined for each node now in the Main List. The attributes and child elements are stored in a temporary list with attributes first and child elements next. The temporary list is called the Attributes-And-Elements-List.

For the XML data of FIG. 1A, the Attributes-And-Elements-List of the root node has two nodes, and the contents of which are:

| Attributes-And-Elements-List (root) |
|---|
| student (for the first student "Sumit") |
| student (for the second student "Reva") |

The contents of the Attributes-And-Elements-List for the root node are added (in order) to the Main List. The Main List, after this addition is:

| Main List | |
|---|---|
| 1. | students |
| 2. | student (the first student "Sumit") |
| 3. | student (the second "Reva") |

Each node of the Attributes-And-Elements-List is then traversed, and another Attributes-And-Elements-List created for each of the traversed nodes. The contents of the newly created Attributes-And-Elements-List are also added to the Main List.

The Attributes-And-Elements-List for the first student "Sumit" is:

| Attributes-And-Elements-List (first student) |
|---|
| name (for the first student) |
| age (for the first student) |
| subject (for the first student) |
| marks (for the first student) |

The Attributes-And-Elements-List of the second student "Reva" is:

| Attributes-And-Elements-List (second student) |
|---|
| name (for the second student) |
| age (for the second student) |
| subject (for the second student) |
| marks (for the second student) |

The contents of the Main List is therefore:

| Main List | |
|---|---|
| 1. | students |
| 2. | student (the first student) |
| 3. | student (the second student) |
| 4. | name (for the first student) |
| 5. | age (for the first student) |
| 6. | subject (for the first student) |
| 7. | marks (for the first student) |
| 8. | name (for the second student) |
| 9. | age (for the second student) |
| 10. | subject (for the second student) |
| 11. | marks (for the second student) |

The above creation of Attributes-And-Elements-Lists is performed for all nodes in all Attributes-And-Elements-Lists of higher nodes. The Main List upon completion of the above process on all nodes is:

| Main List | |
|---|---|
| 1. | students |
| 2. | student (the first student) |
| 3. | student (the second student) |
| 4. | name (for the first student) |
| 5. | age (for the first student) |
| 6. | subject (for the first student) |
| 7. | marks (for the first student) |
| 8. | name (for the second student) |
| 9. | age (for the second student) |
| 10. | subject (for the second student) |
| 11. | marks (for the second student) |
| 12. | #text (History) |
| 13. | #text (75) |
| 14. | #text (Geography) |
| 15. | #text (68) |

The completed Main List is a sequential list of the attributes and elements of each tree node in a specific order. A Parent-Child table can be constructed from the Main List. The Main List is traversed in sequential order starting from position 1. For each node, the position of the node in the Main List is obtained as the node's ID. Further, the number of attributes and child elements of the node is obtained. If the number of attributes and child elements is greater than zero, the node ID, the number of attributes, and the child elements are added to the Parent-Child table.

The number of attributes and child elements of each node in the Main List are:

| Node ID | Node Name | Number of attributes and child elements |
|---|---|---|
| 1 | Students | 2 |
| 2 | student (the first student) | 4 |
| 3 | student (the second student) | 4 |
| 4 | name (for the first student) | 0 |
| 5 | age (for the first student) | 0 |
| 6 | subject (for the first student) | 1 |
| 7 | marks (for the first student) | 1 |
| 8 | name (for the second student) | 0 |
| 9 | age (for the second student) | 0 |
| 10 | subject (for the second student) | 1 |
| 11 | marks (for the second student) | 1 |
| 12 | #text (History) | 0 |
| 13 | #text (75) | 0 |
| 14 | #text (Geography) | 0 |
| 15 | #text (68) | 0 |

The Parent-Child table for the above Main List above is illustrated in Table 4 below:

TABLE 4

| | Node ID | | | | | | |
|---|---|---|---|---|---|---|---|
| | 1 | 2 | 3 | 6 | 7 | 10 | 11 |
| Number of attributes and child elements | 2 | 4 | 4 | 1 | 1 | 1 | 1 |

The structure ID is calculated from the Parent-Child Table using the aforementioned formula (Equation (1)). As the largest node ID is 11, prime numbers up to the 11th prime number need to be obtained.

The first 15 prime numbers are:

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Prime | 2 | 3 | 5 | 7 | 11 | 13 | 17 | 19 | 23 | 29 | 31 | 37 | 41 | 43 | 47 |

Adding the prime numbers to the Parent-Child table (Table 4) in correspondence with the Node IDs, gives:

TABLE 5

| Node ID | 1 | 2 | 3 | 6 | 7 | 10 | 11 |
|---|---|---|---|---|---|---|---|
| Prime Numbers | 2 | 3 | 5 | 13 | 17 | 29 | 31 |
| Number of attributes and child elements | 2 | 4 | 1 | 1 | 1 | 1 | 1 |

The structure ID is computed using Equation (1) and the information in Table 5 which is the parent-child table for the Main List to be:

$$\text{Structure } ID = 2^2 * 3^4 * 5^4 * 13^1 * 17^1 * 29^1 * 31^1$$
$$= 40232497500$$

Figure 3:
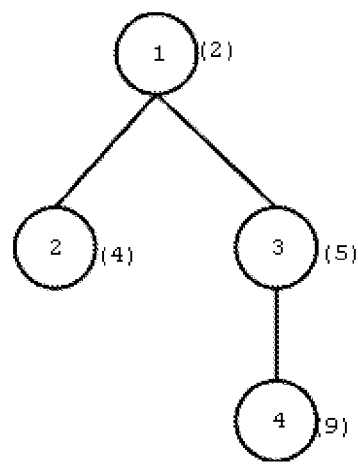
FIG. 3 shows a sub-tree of the tree of FIG. 2A.

As an XML fragment is a sub-tree of an XML tree, the calculation of a structure ID can be similarly applied to fragments. In this case, the fragment node is considered the root of the sub-tree for which the structure ID is to be calculated. FIG. 3 illustrates an XML fragment, which is a sub-tree of the tree of FIG. 2A.

In FIG. 3 the numbers in parenthesis are the node IDs of the sub-tree as they were assigned when the sub-tree was considered together with the tree of FIG. 2A. To calculate the structure ID of the sub-tree, the sub-tree is isolated from the main tree, and new node IDs assigned. The fragment node (node 2) is the root node of the new tree. The newly assigned node IDs are shown in FIG. 3 within the nodes.

The Parent-Child table of the sub-tree is illustrated in Table 6 below:

TABLE 6

| Parent Node IDs | 1 | 3 |
|---|---|---|
| Number of Children | 2 | 1 |
| Primes corresponding to parent node IDs | 2 | 5 |

The steps for calculating the structure ID of an XML fragment are the same as those for calculating the structured ID of an entire XML document except that the process begins from the root node of the sub-tree. The root node of a sub-tree can be determined by traversing the DOM object tree using the DOM APIs if the fragment ID of the sub-tree/fragment is not given:

If the fragment ID is given, the root node is obtained from the position of the node in the Main List. Specifically, the node whose node ID equals the fragment ID is the root node of the sub-tree.

The structure ID of the sub-tree is calculated using Equation (1) and the information of Table 6 to be:

$$\text{Structure } ID = 2^2 * 5^1$$
$$= 20$$

Structure Based Routing

Figure 4:
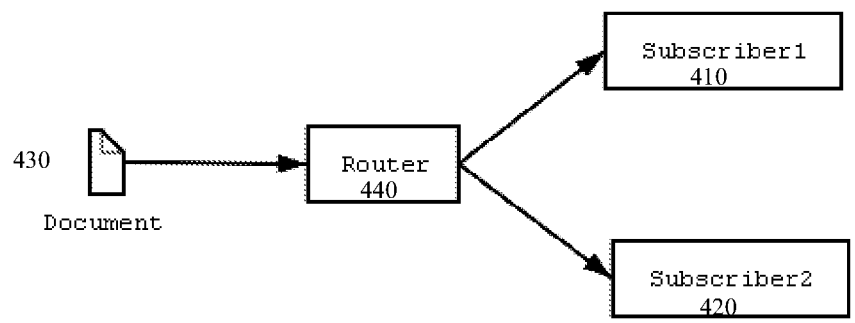
FIG. 4 illustrates a structure-based routing arrangement.

Structure-based routing is described with reference to the arrangement shown in FIG. 4, in which subscribers 410, 420 subscribe to different portions of a document 430, identified by structural semantics. A router 440 filters specific portions of the document 430 and sends them to the appropriate subscriber 410, 420. Subscription based on structural semantics allows the subscription data to remain unchanged even if the attribute and element names of the document are altered.

Routing of data in an XML document is realized by one or more of matching subscription information against the structure ID of an XML document/tree, the structure ID of one or more XML fragments/sub-trees, and a numerical range of structure IDs of full XML documents or XML fragments. Routing may also be realized by matching the structure ID of an XML fragment against a structure ID of a full XML document.

The router 440 stores a map of XML structure IDs vs. subscriber IDs, such that routing of the XML document 440, or fragments thereof, can be realized by obtaining the structure ID of the input XML document/fragment and routing it to subscribers 410, 420 of that structure ID.

Alternatively, the router 440 may perform matching base on the structure ID of one or more XML fragments, where for each input XML document, the router determines the structure IDs of all XML fragments of that document, and routes matching XML document fragments to subscribers 410, 420 of respective fragments.

Still further, the router 440 may match the structure ID of an XML fragment against a fragment ID of an XML document. For each input XML document, the router 440 determines the structure ID of the fragment corresponding to the given fragment ID. If the computed structure ID of the fragment matches the subscribed structure ID, the router 440 routes the matching XML document to the subscriber 410, 420.

In any of the above approaches, the router may also match the structure ID of the XML document/fragment to a numerical range of structures IDs. Combination of one or more of the above routing implementations may also be employed.

Figure 5C:
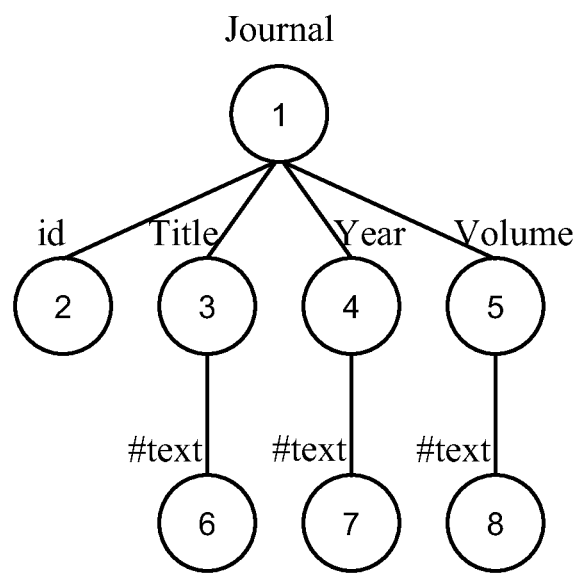
FIG. 5C shows an XML fragment of the document of FIG. 5A, and corresponding tree fragment.

Routing of XML data using structure base encoding of XML documents is described with reference to the exemplary XML document and corresponding tree structure of FIGS. 5A-5C.

FIG. 5A shows the tree structure of an XML document "Library" and its corresponding XML code. "Library" contains sub-trees corresponding to XML fragments "Book" and "Journal." The tree structures of "Book" and "Journal," and corresponding XML code, are shown in FIGS. 5B and 5C. The root of "Book" is node 2 of "Library," and the root of "Journal" is node 3 of "Library." The structure IDs of "Library," "Book," and "Journal" are:

Library=843628500
Book=280
Journal=280 calculated using Equation (1) described above for calculating structure ID.

The XML document "Library" is provided to the router 440 as input. Subscriber1 410 subscribes to the "Book" fragment of the "Library" and Subscriber2 420 subscribes to the "Journal" fragment of the "Library." The subscription information includes the document name and the fragment structure ID. The fragment structure IDs will hereinafter be referred to as <Book> and <Journal> in place of their actual numerical value structure ID to facilitate easier description. Similarly, the structure ID of the "Library" structure will hereinafter be referred to as <Library>.

An operation to route/transfer the values of the "Book" fragment to Subscriber1 involves:
A query operation to find the leaf nodes of the fragment, and
Query arguments: structure ID=<Library>; fragment structure ID=<Book>.

The first query argument <Library> may be obtained either from an internal mapping of document name vs. structure ID accessible by the router, or by parsing the document. The second query argument <Book> may be obtained from the subscription information. The router 440 creates the node ID vs. node value mapping by parsing the document, preferably on the <Book> fragment, and represents the mapping as an XML tree.

The router 440 performs a query of the <Book> fragment to map the node IDs of the fragment to node labels, and obtains the output node IDs 4 (id), 5 (Title) and 6 (Author). The node values corresponding to the output node IDs are obtained. The output values are "B001," "Numerical Analysis," and "Fred Jones," which are then sent to the Subscriber1 410.

The subscription information for Subscriber1 410 is for example Library.XML (document name) and <Book> (fragment Tree Code). The subscription information does not include element or attribute names of the document. In this manner, even if the attribute or element names are altered in the actual document, the subscription information does not change. For example, if the "id" attribute name of the Book fragment in Library.XML is updated to "isbn," the subscription information does not change.

Figure 6:
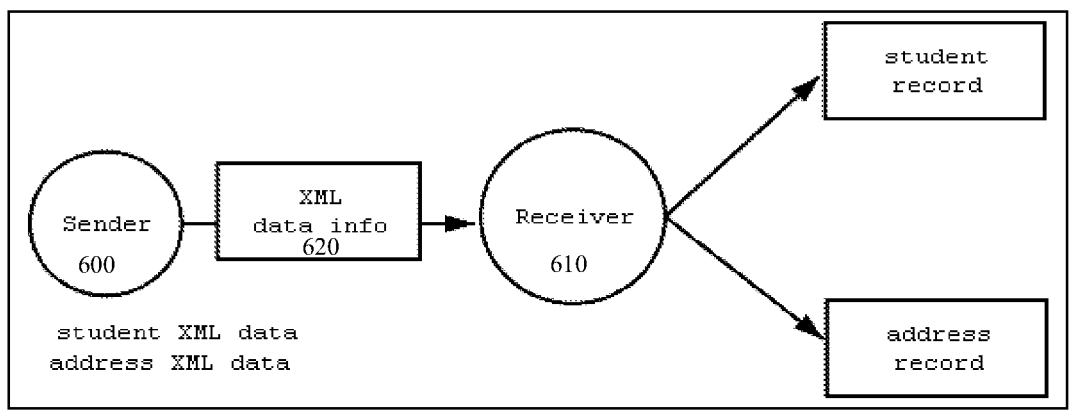
FIG. 6 illustrate an exemplary data routing/transfer arrangement.

FIG. 6 illustrates another exemplary data transfer arrangement. In FIG. 6, XML data 620 is routed/transferred from a sender 600 to a receiver 610. The sender 600 and receiver 610 may each be a computer system 1201 such as that illustrated in FIG. 12. The sender 600 and receiver 610 are connected by a network path. The network path may be, for example, a network path connecting distributed systems via one or more of the Wide Area Network 1220, and the Local Area Network 1222 of FIG. 12. The XML data may be a full XML document, or fragment of XML data content. The receiver 610, upon receiving the transferred XML data, performs appropriate operations thereon to, for example, store, update, query, or retrieve data.

Figure 7A:
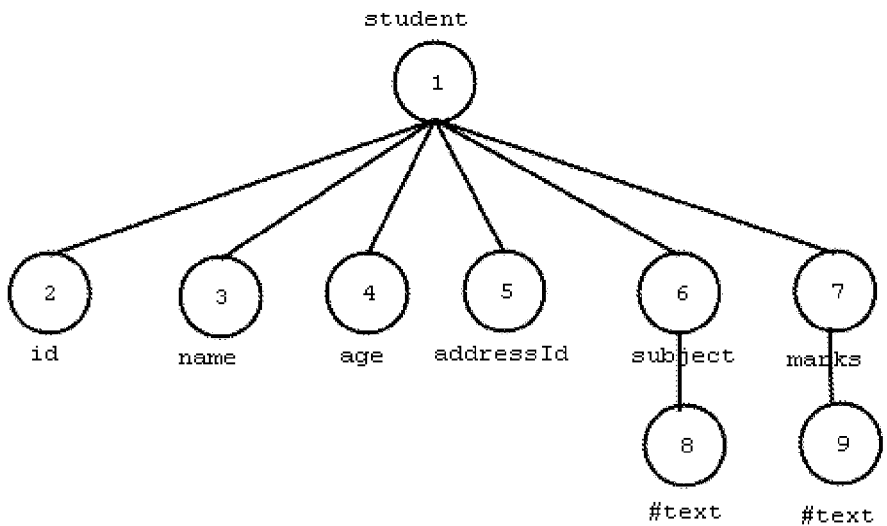
FIG. 7A shows exemplary XML data and a corresponding tree structure.
Figure 7B:
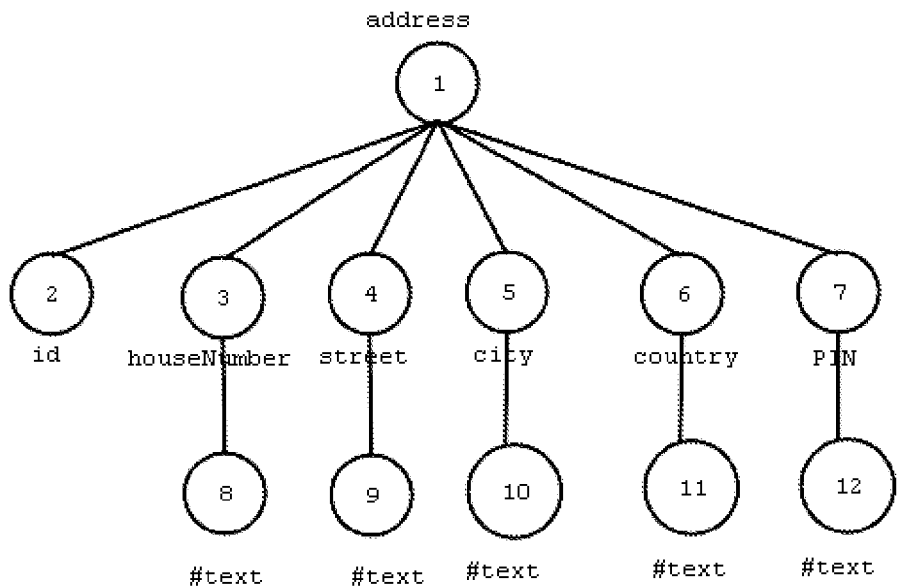
FIG. 7B shows exemplary XML data and a corresponding tree structure.

FIGS. 7A and 7B illustrate exemplary XML data and corresponding tree structures. The tree structures contain nodes which are individually numbered. Each structure is provided with a unique structure ID by which the structure can be identified. Further, each node is provided with a node ID by which the nodes can be identified.

In FIGS. 7A and 7B, the student data structure has a structure ID of "14144" and the address data structure has a structure ID of "5445440." Nodes of the student data structure are respectively numbered with node IDs 1 to 9 beginning from the highest level to the lowest level, and counting from the left to the right within each level. Similarly, nodes of the address data structure are respectively numbered with node IDs 1 to 12.

The data content of FIG. 7A contains information regarding a student, and includes data items for a student ID, name, age, address ID, subject, and marks for the subject. The data content of FIG. 7B contains information regarding a student's address, and includes data items for an address ID, house number, street, city, country, and PIN.

Routing of XML data according to arrangement of FIG. 6 is illustrated by way of the following examples. In the following examples, the XML data of FIGS. 7A and 7B is routed from the sender 600 to the receiver 610 in predetermined formats. The format includes a predetermined delimiter for separating multiple data items, predetermined separator for parsing, the structure ID of the XML data structure, node IDs of the nodes corresponding to the data content, and values corresponding to the node IDs.

Example 1

Example 1 is an operation to update "Sumit's" mark from "75" to "78."
Transfer data is generated from the XML data to have a format of:
<delim>:<sep>: 14144<sep>2<sep>S001<sep>9<sep>78
Setting the predetermined symbol for <sep> as "#," and the predetermined symbol for <delim> as "%," the data sent from the sender to the receiver is:
%:#:14144#2#S001#9#78
Sending the above data in relation to an update operation, causes the data to be interpreted by the receiver as a request to update node 2 (student ID) of structure "14144" (student structure) with the value "S001" and to update node 9 (marks) of the same structure with the value of "78." Updating of the student data structure is hence realized.

Example 2

Example 2, is an operation for updating a "Sumit's" mark "75" to "78," and "Sumit's" house number from "10" to "12." Transfer data is generated from the XML data at the sender's side having a format of:
%:#:14144#2#S001#9#78%5445440#2#A001#8#12
Here:
"14144" is the structure ID of the student data structure
"2" is the node ID of the "ID" node
"S001" is the value for node 2
"9" is the node ID of the marks node
"78" is the value corresponding to node 9

"5445440" is the structure ID of the address data structure
"2" is the node ID of the "ID" node
"A001" is the value corresponding to node 2
"8" is the node ID of the "House Number" node
"12" is the value corresponding to node 8

Upon receiving the transfer data from the sender, the receiver extracts the delimiter and separator from the transfer data and extracts the data items from the transfer data which are delimited by the delimiter. For each data item, the receiver obtains the XML structure ID, the node IDs, and corresponding values. Appropriate data operation and manipulation (e.g., update, addition, deletion, etc.) can then be performed by the receiver on the XML data having the extracted structure ID and node IDs.

Sending the above data in relation to an update operation causes the data to be interpreted as a request to update node 2 (student ID) of structure "14144" (student structure) with the value "S001" and to update node 9 (marks) of the same structure with the value of "78." Further, the receiver updates node 2 (ID) of structure "5445440" (address structure) with the value "A001," and updates node 8 (House Number) with the value "12."

XML data routing according to the example of FIG. 6 involves the generating of the XML data to be transferred, detecting the nodes (represented by node IDs) of the XML data to be sent, obtaining the node values of the nodes to be sent, the selecting of an appropriate separator and delimiter for the XML data, and the arrangement of the XML data into the predetermined format.

The values of the nodes to be sent, if to be obtained from the XML document, can be obtained using the previously described Main List (DOM Parsing) to map the node ID of a node to its node value. Thus the value of a node can be readily obtained by looking up the node ID of a node to be sent from the Main List and retrieving the node value mapped thereto.

The separator and the delimiter need only be defined once at the beginning of the XML data, and may be defined using characters, symbols, strings, and the like, as best suits the application. Preferably, separators and delimiters that do not conflict with the XML data values are selected.

The data transferred according to the arrangement of FIG. 6 does not contain tag or attribute meta-data of the XML document: As a node ID is utilized to identify an updated tag or attribute, and the node ID is appreciably smaller than an XPath expression, data transfer efficiency in terms of reduced redundancy is achieved. Additionally, as the structure ID is used to identify the XML document, XML file names to identify the data need not be transferred. The XML file names of XML documents/filed stored by the receiver can hence be encrypted to hide the context of the information, or not stored at all on the receiver's end.

Structure-Based Query

A structure-based query is a query performed on tree structures where no element or attribute names/values are involved. The inputs to the structural queries are structural artefacts such as node ID, fragment ID and the like. The fragment ID represents the node ID of the root node of a sub-tree, and the term fragment is used synonymously with the term sub-tree. The outputs from the structural query process are node IDs which are termed output node IDs. The inputs and outputs of structural queries are not associated with the attribute or element names/values of a document.

Figure 8:
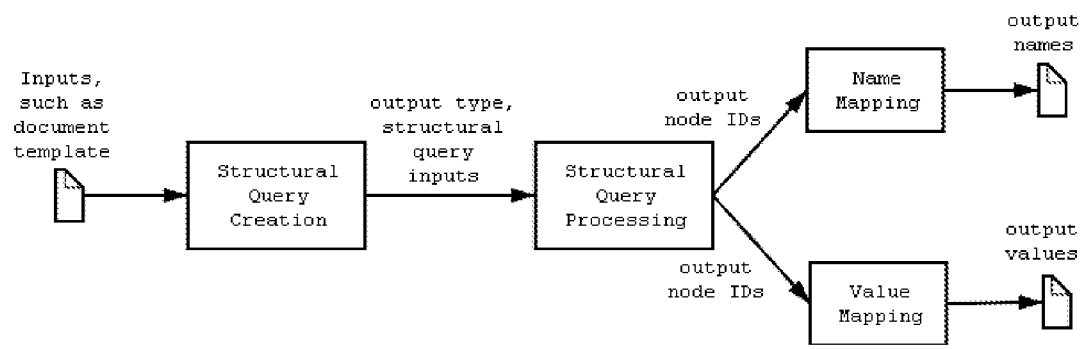
FIG. 8 illustrates a structure-based query.

The term "structure-based" as used herein implies that an intermediate structural query process is involved in a particular process, such as a query, update, etc. The use of the intermediate structural query process overcomes the drawbacks previously mentioned. A structure-based query involves the steps shown in FIG. 8, and described below.

Structure based query of data may be applied, for example, to data mirror sites. For example, a minor site may be set up by one party using a third-party host. The data stored by the host may be encrypted from the host such that the context and content of the data stored by the host (but belonging to the party) is not revealed to the host. In the case of XML data, the XML elements and attribute names, as well as the XML files names may be encrypted. Provision of the XML structure ID is sufficient for the host to identify the appropriate XML file to read. Similarly, provision of a fragment root ID and a node ID is sufficient for the host to identify which value to retrieve or update.

Structural Query Creation

Formulation of any query as a structural query is realized by viewing the entire document as a tree structure and selecting an appropriate structural query which returns the node IDs of the attribute or element names/values desired. A structural query can be formulated from inputs such as a document template or a document schema. A document template is a partial document which does not contain any node values and is meant to convey only the node names and the document structure. A schema describes the structure of a document. Structural query inputs contain only structural entities such as the structure ID, fragment ID, etc. The inputs do not contain element or attribute names of the document. A structural query returns node IDs. A node ID can either refer to a node name or a node value. The output type that is desired (whether name or value) is included with the structural query inputs. This step may be performed during design, and the structural query inputs along with the output type may be pre-configured in the system.

Structural Query Processing

Processing of a structural query results in the output of node IDs. Output node IDs are node IDs whose names or values need to be sent as outputs.

Name Mapping and/or Value Mapping

Based on the output type and the output node IDs, the names and/or values corresponding to the output node IDs are sent as output. The above process is illustrated by way of the following example with reference to the trees illustrated in FIGS. 5A-5C:

The tree structure of FIG. 5A is represented with:

A structure ID denoted as <Library>,

A mapping between node IDs and node names,

| Node ID | Node Name |
| --- | --- |
| 1 | Library |
| 2 | Book |
| 3 | Journal |
| 4 | id |
| 5 | Title |
| 6 | Author |
| 7 | id |

-continued

| Node ID | Node Name |
|---|---|
| 8 | Title |
| 9 | Year |
| 10 | Volume | and

A mapping between node IDs and node values.

| Node ID | Node Value |
|---|---|
| 4 | B001 |
| 7 | J001 |
| 11 | Numerical Analysis |
| 12 | Fred Jones |
| 13 | Journal of Mathematics |
| 14 | 2006 |
| 15 | 12 |

"Library" is designed in such a way that the "Book" and "Journal" fragments have different fragment structure IDs. This allows "Book" and "Journal" to be filtered from "Library" using structural queries.

An operation to retrieve the "Journal" details (i.e., id, Title, Year and Volume values) from "Library," involves:

A query operation to find all the leaf nodes of a fragment specified by a fragment structure ID, and Query arguments: structure ID=<Library>, and fragment structure ID=<Journal>.

The query can be formulated during design time and pre-configured. A software tool may be used to automate some of the query creation steps, such as determining the structure ID of a fragment from its node name, etc. The output type required is node values. The output type is included with the structural query inputs.

The output node IDs for a structural query may be pre-determined from the tree representation of the document and stored as separate mappings (structural query vs. corresponding output node IDs). Alternately, the output nodes Ids corresponding to a structural query may be determined dynamically during the query execution time.

The structural query processing results in the following node IDs as outputs:

7, 13, 14, 15

The output type indicates that values of the output nodes are desired. Hence from the output node IDs, the corresponding values are obtained from the mapping provided. The output values are:

J001, Journal of Mathematics, 2006, 12

When multiple documents are involved in structure-based processing, the name and value mapping provided by the above tables need to be associated with the corresponding document names (which are assumed to be unique). The document name needs to be passed along with the structural query inputs. The structure ID may be dropped from the argument list of the structural query by maintaining a mapping between the document name and the structure ID within the structural query processor:

| Document Name | Structure ID |
|---|---|
| Library.xml | <Library> | where <Library> represents the Tree Code of the document "Library.xml."

Figure 9:
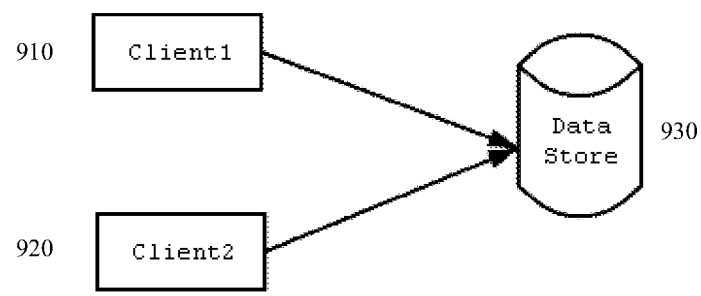
FIG. 9 illustrates a data query arrangement.

The introduction of a structural query processing stage in the overall query processing operation assists in overcoming the previously mentioned drawbacks. This is illustrated with reference to the arrangement shown in FIG. 9, where multiple clients query a data store. Here the clients 910, 920 may not be an end user but a client component which queries and updates a data store. Data transfer takes place between the clients 910, 920 and the data store 930. The clients query and update the data stored in the data store 930.

If the query creation and query processing is performed on the client side, only output node IDs and output type need to be passed between the client 910, 920 and the data store 930, where value mapping will be performed. The output node ID may be represented by a numerical value, and the output type may be represented with a single character "V" to indicate value. This data is significantly shorter compared to a label path-based expression especially when the attribute and element names are long and nesting is deep.

The inputs and outputs of a structure-based query do not contain attribute and element names. Hence, if structural query processing is performed either on the client side (which will require transferring the structural query process outputs) or the data store side (which will require transferring the structural query process inputs), the context of the information transferred is not revealed.

With structure-based query, node IDs are used to identify content instead of node names. Hence, even if the node names differ, the query is still able to identify the appropriate data. By using the document template to create a structure-based query, inputs can have attribute and element names in a language different to that of the names present in the node ID-node name mapping. This resolves globalization issues where element and attribute names are different across the clients and servers.

With structure-based query, if only element and attribute values need to be queried, the only data that needs to be stored in the data store is the node ID vs. node value mapping. The structural query processing can be performed on the client side, and the output node IDs passed to obtain the output values. Thus the context of the data stored is again hidden.

Examples of Structural Queries

Structure-Based

A structural query is represented by three parts:

(a) Operation name (b) Inputs taken (c) Outputs obtained

The following structural queries refer to the tree of FIG. 1B. For clarity and convenience, structure IDs are referred to using the element names of FIG. 1B surrounded by angle brackets, instead of a numerical value. For example, the structure ID of the entire tree will be referred to as <students> and the structure ID of a student fragment will be referred to as <student>.

1. Operation: Find the structure ID of a fragment.
Inputs: structure ID=<students>, fragment root ID=2
Outputs: <student>
2. Operation: Find all the nodes of a fragment.
Inputs: structure ID=<students>, fragment root ID=2
Outputs: 2, 4, 5, 6, 7, 12, 13
3. Operation: Find the first N nodes of a fragment.
Inputs: structure ID=<students>, fragment root ID=2, number of nodes=4
Outputs: 2, 4, 5, 6
4. Operation: Find the nodes of the $i^{th}$ sibling of a fragment.
Inputs: structure ID=<students>, fragment root ID=2, sibling sequence=3
Outputs: 6, 12
5. Operation: Find the $i^{th}$ child node of a node.
Inputs: structure ID=<students>, node ID=2, sibling sequence=3
Output: 6
6. Operation: Find the leaf nodes of the tree.
Inputs: structure ID=<students>
Outputs: 4, 5, 8, 9, 12, 13, 14, 15
7. Operation: Find the leaf nodes of a fragment.
Inputs: structure ID=<students>, fragment root ID=2
Outputs: 4, 5, 12, 13
8. Operation: Find the root nodes of a given fragment specified by its structure ID.
Inputs: structure ID=<students>, structure ID=<student>
Outputs: 2, 3
9. Operation: To find the ancestors of a node.
Inputs: structure ID=<students>, node ID=9
Outputs=1, 3
10. Operation: To find the descendants of a node.
Inputs: structure ID=<students>, node ID=3
Outputs: 8, 9, 10, 11, 14, 15

In addition the node type (element name, element value or attribute node) of a node of XML data can be determined. This feature can add filtering based on node types.

Structure-Based Update

Structure-based updates are similar to structure-based queries. In structure-based updates, new values which need to be updated are passed along with the query inputs. The output node IDs obtained during the query processing stage locates the nodes to be updated with the new values. The new values are updated in the name and value maps.

Structure-Based Filtering

Structure based identification of XML documents using structure ID can be employed in the classification of XML documents. XML documents can be classified based on their structures and structural ranges. They may be stored in databases from which they can be queried based on their structures. XML documents can be further filtered based on their structures. This is useful when XML documents of a particular structure ID are sought, and any other XML document of a different structure ID are to be rejected. XML documents whose content cannot be determined can also be identified using structure base identification. This technique can be used in applications where the content of the XML files cannot be determined but the XML documents can be distinguished based on their structures, such as when the XML tags and values of an XML document are encrypted.

Figure 10:
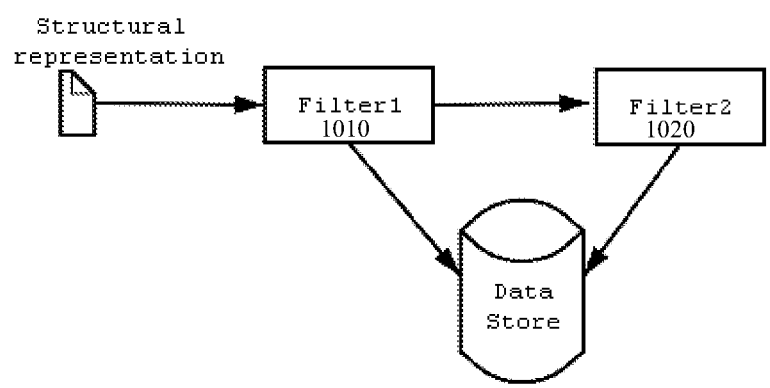
FIG. 10 illustrates a structure-based filtering arrangement.

Structure-based filtering allows a concise representation of an XML document to be passed along a process, and relevant data filtered from this concise representation. The filtering provides node IDs as output. The actual data is queried from a data store after the filtering process. This mechanism addresses the $4^{th}$ disadvantage (no concise representation of XML for filtering information) previously described in the background. FIG. 10 shows a simple scheme for structure based filtering.

Structure-based filtering is described with reference to the arrangement of FIG. 10, and the Library XML document of FIG. 5A. Filter1 1010 is set to extract the "Book" fragment from the "Library" and Filter2 1020 is set to extract the "Journal" fragment from the "Library." The document name and the structure ID of the Library (which is represented as <Library>) are passed along the filtering process. Filter1 1010 performs a structure-based query to obtain the leaf nodes of the "Book" fragment from the structure represented by the <Library> structure ID.

The structural query inputs for this operation are:
Query Operation: Find the leaf nodes of a fragment.
Query Arguments Structure ID=<Library>, fragment Structure ID=<Book>.

The output type is a value.

The first query argument <Library> is the concise representation of the document which is passed to the filter along with the document name. The other inputs are pre-configured in the filter. The structural query returns the output node IDs 4 (id), 11 (Title) and 12 (Author). This structural query operation forms the filtering process. After this filtering process, the filter obtains the values associated with the output node IDs from the data store. The query inputs passed are the document name and output node Ids. The query outputs are the output values of the corresponding nodes (B001, Numerical Analysis and Fred Jones).

The same operations are performed by Filter2, which filters the "Journal" fragment.

Filtering is performed on a concise representation of the document (i.e., the structure ID) and not the actual document: Hence, the concise representation may be passed across a workflow/process instead of passing the actual document (which may be too large to pass across the network).

This results in a significant reduction in data transferred across the network. The filtering process is also sped up since the filtering does not require parsing on actual documents but instead performs computations on the structure ID and subsequent querying of output node values from the data store.

Structure base filtering and identification of XML documents can additionally be used in structural based coding of XML documents. Structural based coding can be used to differentiate between XML files having the same structures and similar content, by adding redundant tags to differentiate them structurally. For example, redundant tags added immediately after the root node, will have the same fragment ID for all XML documents. Thus different XML files can be differentiated by this combination of fragment root ID and fragment structure ID.

Special Cases and Determining Node Type from Structure ID

Figure 11A:
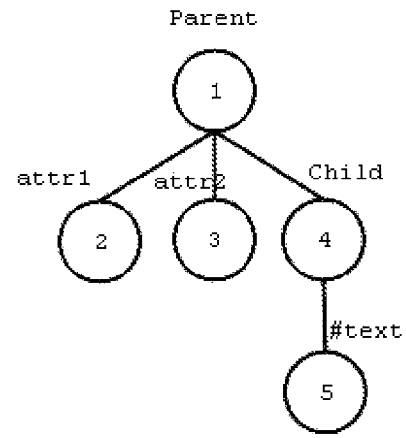
FIG. 11A shows exemplary XML data and a corresponding tree structure.
Figure 11B:
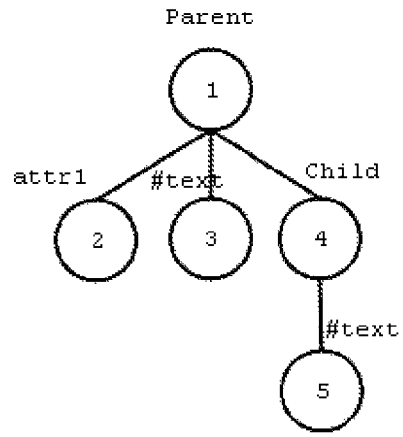
FIG. 11B shows exemplary XML data and a corresponding tree structure.

In some cases, two different XML documents may be represented by having the same tree structure. For example, the XML data:

```
<Parent attr1="A1" attr2="A2">
    <Child>hello</Child>
</Parent>
``` has the tree representation shown by FIG. 11A, and the XML data:

```
<Parent    attr1="A1">
            Text1
    <Child>hello</Child>
    </Parent>
``` has the tree representation shown by FIG. 11B.

The trees in FIG. 11A and FIG. 11B are structurally equivalent. However, it is ambiguous whether node 3 is an attribute node or a value node. The case where the conflicting node is a value node is referred to as a special case and the corresponding node is referred to as a special node. In contrast the cases where the conflicting node is an attribute node is referred to as the general case. FIG. 11A therefore represents a general case, and FIG. 11B represents a special case. In FIG. 11B, node 3 is a special node. Special nodes have the property that they are value nodes and their parent nodes have grandchild nodes.

The structure ID in such conflicting cases is made unique by appending the special nodes for special cases to the structure ID of the corresponding general case. For example, the structure ID of FIG. 11B is represented as <Parent> (3), where node 3 is a special node since its parent node (node 1) has a grandchild node (node 5). If a tree has multiple such special nodes, they are appended as a list, for example, a comma-separated list.

The node type of an XML tree can be determined from its structure ID in the following manner:

Leaf nodes are nodes which do not have child nodes.

A node is an attribute node if it is a leaf node, not a special node and its parent node has a grandchild node.

Figure 11C:
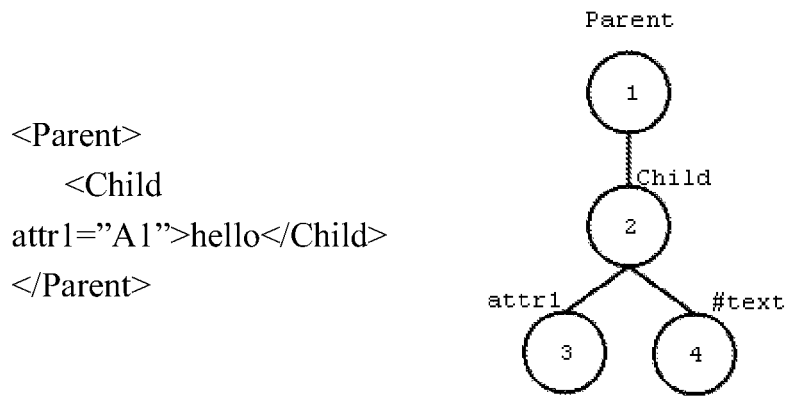
FIG. 11C shows exemplary XML data and a corresponding tree structure.

If a parent node has only leaf nodes as children, the last leaf node must be a value node, and all other leaf nodes are attribute nodes. This is illustrated in FIG. 11C.

Figure 11D:
FIG. 11D shows exemplary XML data and a corresponding tree structure.

If a parent has only one leaf node as child, that node must be a value node. This is illustrated in FIG. 11D.

The leaf nodes which are not attribute nodes are value nodes.

Nodes which are neither attribute nodes nor value nodes are name nodes.

Figure 11E:
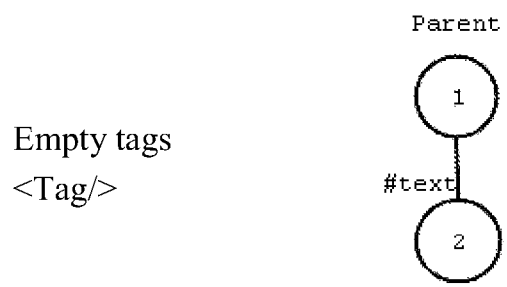
FIG. 11E shows exemplary XML data and a corresponding tree structure.

Empty tags are taken to be equivalent to begin and end tag with an empty value node in it. This is illustrated by FIG. 11E The foregoing describes only some embodiments of the present invention, and modifications and/or changes can be made thereto without departing from the scope and spirit of the invention, the embodiments being illustrative and not restrictive.

What is claimed is:

1. A method for storing, accessing, and routing data values of an extensible markup language (XML) document without revealing context-identifying metadata that describes the data values or encrypting the data values, comprising:
generating a tree structure from the data values of the XML document by parsing the XML document with a Document Object Model (DOM) parser, creating the tree structure including a plurality of nodes that are each sequentially assigned a whole number integer node identifier (ID) from a sequential set of natural numbers, with each node being characterized by one of a set of node value(s) extracted from the respective data values of the XML document, where the tree structure omits the context-identifying metadata;
calculating, using the whole number integer node IDs identifiers (IDs) sequentially assigned to each of the plurality of nodes from the sequential set of natural numbers, a structure identifier (ID) that mathematically defines relationships among and between the plurality of nodes of the tree structure, the structure ID being a set of number(s) that forms a representation of node relationships in the tree structure, with the structure ID being independent of node names and further independent of the set of node value(s);
storing a mapping of the structure ID to the tree structure; and
assigning the whole number integer node IDs sequentially from the sequential set of natural numbers to each node of the tree structure, wherein each parent node of the tree structure comprises at least one child node, and where calculating, using the whole number integer node IDs sequentially assigned to each of the plurality of nodes from the sequential set of natural numbers, the structure ID that mathematically defines the relationships among and between the plurality of nodes of the tree structure comprises:
  selecting, using the assigned whole number integer node ID of a respective parent node as an index, a prime number within an indexed set of prime numbers that corresponds to the index;
  calculating the structure ID by calculating a plurality of results, where each result represents one parent node and comprises the selected prime number raised to a power of a number of child nodes of the respective parent node; and
  calculating the structure ID as a mathematical product of the plurality of results to represent a structure of the tree structure;
matching, by a router, subscription information of one or more subscribers, comprising a subscriber structure ID against the structure ID of the tree structure, or a fragment thereof;
filtering, by the router, data values of the XML document corresponding to the subscription information matching the structure ID of the tree structure or the fragment thereof;
formatting, by the router the data values of the XML document corresponding to the subscription information matching the structure ID or fragments thereof into a pre-determined format comprising a delimiter separating multiple data items and a predetermined separator for parsing the structure ID of the tree structure; and
routing, by the router, the data values of the XML document corresponding to the structure ID or the fragment thereof of that matches the subscriber information, to the one or more subscribers mapped to the subscriber structure ID.

2. The method of claim 1, where assigning the whole number integer node IDs sequentially from the sequential set of natural numbers to each node of the tree structure comprises assigning a unique whole number integer node ID from the sequential set of natural numbers to each node of the tree structure beginning from a highest level to a lowest level and from a left to right within each level of the tree structure.

3. The method of claim 1, further comprising storing a mapping of a node name of each node of the tree structure to a respective whole number integer node ID.

4. The method of claim 1, further comprising storing a mapping of a node value of each node of the tree structure to a respective whole number integer node ID.

5. The method of claim 1, where the tree structure represents a structure of the XML document, and the calculated structure ID uniquely mathematically identifies a structure of the tree structure of the XML document.

6. A system for storing, accessing, and routing data values of an extensible markup language (XML) document without revealing context-identifying metadata that describes the data values or encrypting the data values, comprising:
  a memory; and
  a processor programmed to:
    generate a tree structure from the data values of the XML document by parsing the XML document with a Document Object Model (DOM) parser, creating the tree structure including a plurality of nodes that are each sequentially assigned a whole number integer node identifier (ID) from a sequential set of natural numbers, with each node being characterized by one of a set of node value(s) extracted from the respective data values of the XML document, where the tree structure omits the context-identifying metadata;
    calculate, using the whole number integer node IDs sequentially assigned to each of the plurality of nodes from the sequential set of natural numbers, a structure identifier (ID) that mathematically defines relationships among and between the plurality of nodes of the tree structure, the structure ID being a set of number(s) that forms a representation of node relationships in the tree structure, with the structure ID being independent of node names and further independent of the set of node value(s);
    store a mapping of the structure ID to the tree structure within the memory; and
    assign the whole number integer node IDs sequentially from the sequential set of natural numbers to each node of the tree structure, wherein each parent node of the tree structure comprises at least one child node, and where, in being programmed to calculate, using the whole number integer node IDs sequentially assigned to each of the plurality of nodes from the sequential set of natural numbers, the structure ID that mathematically defines the relationships among and between the plurality of nodes of the tree structure, the processor is programmed to:
      select, using the assigned whole number integer node ID of a respective parent node as an index, a prime number within an indexed set of prime numbers that corresponds to the index;
      calculate the structure ID by calculating a plurality of results, where each result represents one parent node and comprises the selected prime number raised to a power of a number of child nodes of the respective parent node; and
      calculate the structure ID as a mathematical product of the plurality of results to represent a structure of the tree structure;
    matching, by a router, subscription information of one or more subscribers, comprising a subscriber structure ID against the structure ID of the tree structure, or a fragment thereof;
    filtering, by the router, data values of the XML document corresponding to the subscription information matching the structure ID of the tree structure or the fragment thereof;
    formatting, by the router the data values of the XML document corresponding to the subscription information matching the structure ID into a pre-determined format comprising a delimiter separating multiple data items and a predetermined separator for parsing the structure ID of the tree structure; and
    routing, by the router, the data values of the XML document corresponding to the structure ID or fragments thereof of that matches the subscriber information, to the one or more subscribers mapped to the subscriber structure ID.

7. The system of claim 6, where, in being programmed to assign the whole number integer node IDs sequentially from the sequential set of natural numbers to each node of the tree structure, the processor is programmed to assign a unique whole number integer node ID from the sequential set of natural numbers to each node of the tree structure beginning from a highest level to a lowest level and from a left to right within each level of the tree structure.

8. The system of claim 6, where the processor is further programmed to store a mapping of a node name of each node of the tree structure to a respective whole number integer node ID within the memory.

9. The system of claim 6, where the processor is further programmed to store a mapping of a node value of each node of the tree structure to a respective whole number integer node ID within the memory.

10. The system of claim 6, where the tree structure represents a structure of the XML document, and the calculated structure ID uniquely mathematically identifies a structure of the tree structure of the XML document.

11. A computer program product comprising a computer readable storage device including computer readable program code, where the computer readable program code when executed on a computer causes the computer to:
  generate a tree structure from data values of an extensible markup language (XML) document by parsing the XML document with a Document Object Model (DOM) parser, creating the tree structure including a plurality of nodes that are each sequentially assigned a whole number integer node identifier (ID) from a sequential set of natural numbers, with each node being characterized by one of a set of node value(s) extracted from the respective data values of the XML document, where the tree structure omits context-identifying metadata of the XML document that describes the data values;
  calculate, using the whole number integer node IDs sequentially assigned to each of the plurality of nodes from the sequential set of natural numbers, a structure identifier (ID) that mathematically defines relationships among and between the plurality of nodes of the tree structure, the structure ID being a set of number(s) that forms a representation of node relationships in the tree structure, with the structure ID being independent of node names and further independent of the set of node value(s);
  store a mapping of the structure ID to the tree structure; and
  assign the whole number integer node IDs sequentially from the sequential set of natural numbers to each node of the tree structure, wherein each parent node of the tree structure comprises at least one child node, and where in causing the computer to calculate, using the whole number integer node IDs sequentially assigned to each of the plurality of nodes from the sequential set of natural numbers, the structure ID that mathematically defines the relationships among and between the plurality of nodes of the tree structure, the computer readable program code when executed on the computer causes the computer to:

select, using the assigned whole number integer node ID of a respective parent node as an index, a prime number within an indexed set of prime numbers that corresponds to the index;

calculate the structure ID by calculating a plurality of results, where each result represents one parent node and comprises the selected prime number raised to a power of a number of child nodes of the respective parent node; and calculate the structure ID as a mathematical product of the plurality of results to represent a structure of the tree structure;

match, by a router, subscription information of one or more subscribers, comprising a subscriber structure ID against the structure ID of the tree structure, or a fragment thereof;

filter, by the router, data values of the XML document corresponding to the subscription information matching the structure ID of the tree structure or the fragment thereof;

format, by the router, the data values of the XML document corresponding to the subscription information matching the structure ID or fragments thereof into a pre-determined format comprising a delimiter separating multiple data items and a predetermined separator for parsing the structure ID of the tree structure; and route, by the router, the data values of the XML document corresponding to the structure ID or the fragment thereof of that matches the subscriber information, to the one or more subscribers mapped to the subscriber structure ID.

12. The computer program product of claim 11, where in causing the computer to assign the whole number integer node IDs sequentially from the sequential set of natural numbers to each node of the tree structure, the computer readable program code when executed on the computer causes the computer to assign a unique whole number integer node ID from the sequential set of natural numbers to each node of the tree structure beginning from a highest level to a lowest level and from a left to right within each level of the tree structure.

13. The computer program product of claim 11, where the computer readable program code when executed on the computer further causes the computer to store a mapping of a node name of each node of the tree structure to a respective whole number integer node ID.

14. The computer program product of claim 11, where the computer readable program code when executed on the computer further causes the computer to store a mapping of a node value of each node of the tree structure to a respective whole number integer node ID.

15. The computer program product of claim 11, where the tree structure represents a structure of the XML document, and the calculated structure ID uniquely mathematically identifies a structure of the tree structure of the XML document.

* * * * *